Patented Mar. 6, 1951

2,544,363

UNITED STATES PATENT OFFICE 2,544,363

CARBON BLACK PIGMENT DISPERSION

Otto Siemons, Keyport, N. J., assignor to E. I. du Pont de Nemours & Company, Wilmington, Del., a corporation of Delaware No Drawing. Application July 19, 1947, Serial No. 762,201

7 Claims. (Cl. 106—193)

This invention relates to a process for dispersing carbon black pigment, and, more particularly, to an improved process for dispersing such pigment in cellulose nitrate compositions whereby considerable economies and improved properties are secured.

Carbon black pigments are produced in a dry state and are not in the category of the water pulp pigments. While they may be dispersed by the method described in Hucks 2,140,745, an improvement thereover has been discovered by which the cost of operation may be materially reduced.

In dispersing carbon black pigments, the agglomerates of pigment are broken down and the ultimate color quality of the coating composition produced therefrom is a function of the average particle size. Consequently, it is desirable to subject the pigment to a dispersion process which will disintegrate the agglomerates to a maximum degree and thereby achieve minimum particle size at minimum cost.

Various methods have been employed for dispersing carbon black pigments in cellulose nitrate coating composition vehicles. For instance, pigments have been dispersed in a plasticized cellulose nitrate colloid on a two-roller mill, in which the pigmented material is subjected to tremendous shearing forces as it passes between closely coupled metal rolls rotating at different speeds. In that process, the stiffness of the colloid increases because the volatile constituents vaporize, and the temperature of the batch rises unless adequate cooling facilities are provided. Since the plastic is a relatively good insulator, the rate of heat transfer is low and leads to local overheating and possible igniting of the readily combustible product. The presence of vapors, from the inflammable liquids which originally wet the cellulose nitrate colloid, adds to the hazard. Furthermore, during such dispersing operations, there may be a volatilization loss of 5 to 20% from the initially charged colloid, which constitutes an economic loss.

Hucks 2,140,745 discloses (in Example 7) a process for dispersing carbon black pigment in a water-wet cellulose nitrate composition but, in addition to the water introduced by the water-wet cellulose nitrate, sufficient further water is added to produce a slurry of the carbon black pigment. This forms a water-wet carbon black pigment, and the cellulose nitrate is colloided simultaneously with the pigment dispersion. When operating in a kneading machine, as described in Hucks 2,140,745, the material, after removal of the water by decantation, must be sufficiently stiff to accomplish the desired dispersion, but not so stiff as to exceed the power capacity of the kneader after further water is lost, or to cause the colloid to disintegrate into small lumps not subject to further kneading. Hucks' resulting aqueous pigment slurry preferably has a pigment content of 16% to 23%, which is unsatisfactory for direct processing on a roller mill without precolloiding and partial water removal.

This invention, therefore, has as an object a method of dispersing carbon black pigment in a cellulose nitrate vehicle.

Another object is a method of producing a plastic intermediate which, when incorporated with other lacquer ingredients, yields a coating composition having superior "jetness" of color, exceptionally high gloss, and freedom from grit normally attributed to the pigment.

An additional object is a method of dispersing carbon black pigment which effects a significant economy of manpower and of raw material costs.

A further object is a process of dispersing carbon black pigment in a cellulose nitrate vehicle with a minimum amount of combustion hazard.

A still further object is a method of dispersing carbon black pigment in cellulose nitrate which yields an intermediate that may be safely handled, stored, or shipped.

Other objects will become apparent as the description proceeds.

These objects are accomplished by premixing dry carbon black pigment, plasticizer, and water-wet cellulose nitrate to a uniform distribution, with substantially no colloid formation, and then colloiding the premixed product on differential speed rolls until substantially all of the water is volatilized.

Specifically, this invention involves a two-stage operation, comprising, as the preliminary mixing stage, tumbling dry carbon black pigment, a plasticizer, and water-wet cellulose nitrate in a barrel or a ball mill (but without the steel balls or pebbles present to effect grinding) until a uniformly mixed damp, black powder is obtained, the cellulose nitrate remaining substantially uncolloided, and, as the dispersing stage, colloiding the premixed product on a differential speed two-roller mill, in which the slower roll is maintained at a temperature of 140–175° F. and the faster roll is maintained at 100° F. or lower (preferably room temperature or cooler), and repeatedly passing the mass through the bite of the rolls until the desired loss of water is accomplished. After the dispersing stage, the hot plastic sheet is stripped from the roll and deposited in a storage container. On cooling to room temperature, the black plastic becomes brittle and friable and, if desired, may be broken into small pieces for convenience in handling.

The following are illustrative examples of the practice of the invention, the parts being by weight:

EXAMPLE 1

Preliminary mixing stage

| | Per cent |
|---|---|
| Cellulose nitrate (¼ sec.) (24% water) | 65.83 |
| Dibutyl phthalate | 17.50 |
| Oil-soluble nigrosine toner (65% solids) | 5.84 |
| Carbon black pigment (high color) | 10.83 |
| | 100.00 |

The cellulose nitrate was the low viscosity lacquer type. The viscosity was 4–5 seconds as determined by A. S. T. M. Specifications D–301–33, Formula C. This material was used in the water-wet form, thus dispensing with the usual alcohol dehydration stage.

The Nigrosine Toner consisted of 40 parts of oil-soluble nigrosine base reacted with 60 parts of commercial oleic acid and cut to 65% solids in either industrial xylol or high solvency petroleum naphtha of similar distillation characteristics.

The carbon black pigment was the high color channel type characterized by an estimated average particle size of 7 millimicrons and a fixed carbon content of 85–88%.

The ingredients of this composition were charged into a conventional ball mill paint mixer, without any grinding medium since merely uniform distribution was desired. A small piece of non-sparking chain is preferably placed in the mill with the charge to prevent non-uniform compositions from adhering to the mill surfaces. The mill was rotated for 45 minutes to insure uniform distribution, and the premixed product was a damp, black, powdery or sandy mass without any substantial colloiding of the cellulose nitrate.

Dispersing stage

A 12-pound charge of the uniform product of the preliminary mixing stage was placed on a differential speed roller mill, the slower roll being maintained at about 160–170° F. The charge as it colloided was preferentially picked up by the hot slower roll, after passing through the limited clearance between the rolls, and adhered thereto as a hot plastic sheet until the balance of the charge, directly above the bite of the rolls, interfered with the adhesion, causing the plastic sheet to break up into small pieces which were added to the accumulation for repassage through the rolls. The charge was thus automatically repassed through the rolls for 12 minutes and 14% of the weight of the charge was lost through volatilization. Under normal operating conditions such a loss occurs in 9 to 13 minutes, which is equivalent to a yield of approximately one pound of dispersion intermediate per minute of rolls operation.

The hot plastic sheeting was then stripped from the roll and deposited in a suitable container where it cooled while other charges were processed. Cooling to room temperature rendered the sheeted colloid sufficiently brittle to permit disintegration into small chips.

After dispersion, the product had the following composition:

| | Per cent |
|---|---|
| Cellulose nitrate (dry weight) | 58.4 |
| Dibutyl phthalate | 20.5 |
| Oil-soluble nigrosine toner (solids) | 4.5 |
| Carbon black pigment | 12.7 |
| Volatile content | 3.9 |
| | 100.0 |

The volatile content consisted mostly of water, with some residual hydrocarbon, the latter having been introduced as the original solvent for the Nigrosine Toner.

This pigmented intermediate was formulated into a representative automotive black lacquer of the following composition:

Black lacquer—low viscosity

| | Per cent |
|---|---|
| First portion: | |
| Toluene | 12.7 |
| Butyl alcohol | 3.7 |
| Butyl acetate | 13.2 |
| Cellulose nitrate (¼ sec.) (35.3% isopropyl alcohol) | 9.9 |
| Anhydrous isopropyl alcohol | 1.4 |
| Rolls stock (dispersing stage product of Example 1) | 14.2 |
| Second portion: | |
| Butyl acetate | 4.0 |
| Methyl ethyl ketone | 7.2 |
| Amyl acetate | 5.0 |
| Butyl alcohol | 2.5 |
| Anhydrous isopropyl alcohol | 6.9 |
| Toluene | 7.5 |
| Blown castor oil | 2.1 |
| Alkyd resin (60% solids) | 6.1 |
| Ester gum | 3.6 |
| | 100.0 |

The alkyd resin was a 45% hydrogenated castor oil modified glyceryl phthalate cut to 60% solids in toluene.

The ingredients of the first portion were charged into a paddle mixer and mixed 7 hours as a viscous paste. The ingredients of the second portion were then individually added and the mixing continued for 2 hours.

The lacquer, whch has a viscosity of 190 centipoises at 25° C., was reduced to a spraying consistency of 50 centipoises by mixing 5 volumes of lacquer with 3 volumes of rich lacquer thinner. The reduced material was applied by spraying 3 double coats on primed and surfaced steel to a top coat film thickness of at least 1.5 mils, and force dried 30 minutes at 180° F.

This finish exhibited superior jetness of color and gloss, as well as freedom from grit, without alteration in other physical properties, compared with the same composition formulated with prior carbon black dispersions.

EXAMPLE 2

Preliminary mixing stage

| | Per cent |
|---|---|
| Cellulose nitrate (½ sec.) (22% water) | 67.30 |
| Dibutyl phthalate | 17.50 |
| Copper naphthenate solution (8% copper) | 1.87 |
| Benzidine base | 0.25 |
| Butyl acetate (commercial 90%) | 2.25 |
| Carbon black pigment (high color) | 10.83 |
| | 100.00 |

The cellulose nitrate in this example had a viscosity of 3-4 seconds as determined by A. S. T. M. Specifications D-301-33, Formula B.

The copper naphthenate solution was a copper salt of naphthenic acids cut to about 75% solids in petroleum hydrocarbon fraction, with an ultimate copper content of 8%.

The benzidine base is variously known as p,p'-bianiline or 4,4'-diaminobiphenyl. Since it was a solid material not readily soluble, it was predissolved, along with the viscous copper naphthenate solution, in the butyl acetate and at least part of the dibutyl phthalate for convenience and uniform distribution in the preliminary mixing stage. The balance of the processing was similar to that described in Example 1.

Unlike Example 1, however, this composition contained a small amount of volatile solvent for the cellulose nitrate in addition to the plasticizer. This component was lost by volatilization during processing, but its use permitted a higher cellulose nitrate content in the dispersion intermediate without increasing the plasticizer.

When this dispersion of carbon black pigment was formulated in the lacquer composition described in Example 1, but using ½ second viscosity cellulose nitrate throughout, it yielded a product having a viscosity of 10 to 15 poises at 25° C. This was reduced to a spraying consistency of 50 centipoises by mixing 5 volumes of lacquer with 6 volumes of rich lacquer thinner. When the reduced material was applied as described in Example 1, it likewise exhibited superior jetness of color and gloss, and freedom from grit, in comparison with an equivalent dispersion based on alcohol-wet cellulose nitrate.

EXAMPLE 3

*Preliminary mixing stage*

| | Per cent |
|---|---|
| Cellulose nitrate (½ sec.) (23% water) | 66.10 |
| Dibutyl phthalate | 17.50 |
| Oil-soluble nigrosine toner (65% solids) | 3.50 |
| Copper naphthenate solution (8% copper) | 1.85 |
| Benzidine base | 0.25 |
| Carbon black pigment (high color) | 10.80 |
| | 100.00 |

As in Example 2, it was preferred to predissolve the benzidine base in the other liquid components in a ball mill.

The balance of the processing was similar to that described in the previous examples.

EXAMPLE 4

*Preliminary mixing stage*

| | Per cent |
|---|---|
| Cellulose nitrate (½ sec.) (23% water) | 65.05 |
| Dibutyl phthalate | 17.50 |
| Oil-soluble nigrosine toner (65% solids) | 3.30 |
| Copper naphthenate solution (8% copper) | 2.05 |
| Benzidine base | 0.27 |
| Carbon black pigment (medium color) | 11.83 |
| | 100.00 |

The carbon black pigment used in this example was a medium color quality channel carbon black pigment which had an estimated particle size of 9 millimicrons and a fixed carbon content of 94-96%.

The processing steps were the same as described in the previous examples.

This more highly pigmented composition processed just as well as the compositions of the previous examples and showed exceptionally high gloss, excellent color depth, and freedom from dispersion grit.

It is sometimes desirable to incorporate even still higher pigmentation in the finished lacquer, in which case the compositions of the intermediates represented by the previous examples are inadequate because of the high ratio of binder to pigment. The following example illustrates higher pigmentation with lower cellulose nitrate content and higher water content, the latter serving as a temporary volatile vehicle:

EXAMPLE 5

*Preliminary mixing stage*

| | Per cent | |
|---|---|---|
| Carbon Black Pigment (high color) | 15.48 | |
| Oil-Soluble Nigrosine Toner (65% solids) | 2.47 | |
| Copper Naphthenate Solution (8% copper) | 2.77 | Mix for 15 minutes |
| Benzidine Base | 0.38 | |
| Dibutyl Phthalate | 15.50 | |
| Water | 19.90 | |
| Cellulose Nitrate (¼ sec.) (25% water) | 43.50 | add and mix for 30 minutes. |
| | 100.00 | |

It should be noted that the added water in this premixing stage does not produce a slurry, but is only sufficient at most to satisfy the oil adsorption of the increased amount of pigment. The oil adsorption of the high color carbon black used herein conforms to the specification of about 135 pounds per 100 pounds of pigments using Gardner's Standard Rub-Out Linseed Oil Method. The medium color pigment such as used in Example 4 is characterized by an oil adsorption of 100 pounds. Although adsorption is generally measured with linseed oil, it is known that the adsorption values of carbon black using liquid lacquer plasticizers such dibutyl phthalate and tricresyl phosphate are substantially higher than the oil values.

The premixing was accomplished as described in the previous examples.

*Dispersing stage*

The premixed product was charged on the two-roller mill, as described in Example 1, and 28.6% of the weight of the charge was lost through partial exudation of water and volatilization of water and other volatile liquid components within 10 minutes.

The finished dispersion intermediate had the following composition:

| | Per cent |
|---|---|
| Cellulose nitrate (dry weight) | 45.5 |
| Oil-soluble nigrosine toner (solids) | 2.2 |
| Copper naphthenate (solids) | 3.1 |
| Benzidine base | 0.5 |
| Dibutyl phthalate | 21.7 |
| Carbon black pigment | 21.7 |
| Volatile content | 5.3 |
| | 100.0 |

The volatile content was mostly water as described in Example 1.

The dispersion intermediate of this example contained 70% more pigment than that of Example 1.

In formulating the finished black lacquers, it is preferred to use a dispersion intermediate which requires a minimum further addition of cellulose nitrate in conformance with the specified composition. Consequently, although the product of Example 5 appears to offer significant economy and increased capacity on the basis of pigment dispersed, it is not preferred in products carrying normal pigmentation because of the increased "let down." Experience has shown that for some unknown reason carbon black dispersions do not yield their optimum color quality when mixed with significant quantities of additional cellulose nitrate.

Numerous other examples embodying the adaptation of this novel process of dispersion to carbon black pigmented compositions may be formulated but the examples are merely given as illustrative of variables affecting the operation of the process. A balanced composition is required to supply sufficient solvent for the cellulose nitrate in the presence of the water so that the mass will colloid under heat and pressure, and yet form a hard colloid with a low cohesive force, so the rolls charge will automatically break down from a sheet stock to disintegrated pieces as it is added to the bite charge above the rolls.

Although not essential to the practice of this invention, it is preferred to add a small amount of a dispersing agent, such as an oil-soluble nigrosine toner, a copper naphthenate solution, or an amine stabilizer, to the mass to be premixed.

Physical characteristics of the rolls equipment largely control the amount of the charge. The above examples are based on operations with a standard size two-roller mill having the following physical characteristics:

Iron rolls—16 inches diameter and 42 inches length.
Front roll (heated)—12 R. P. M. preferably maintained at 160° to 170° F.
Back roll (cooled)—14 R. P. M.
Clearance between rolls—.007 to .01 inch.

However, variations in these characteristics may be made so long as the charge is maintained at about 10% to 30% in excess of that required to completely envelop one roll with sheeted stock (preferably not exceeding a thickness of ¼ inch) and the temperature differential of the two rolls is maintained.

Similar compositions to those cited above, but containing alcohol-wet cellulose nitrate, may be processed on the two-roller mill, but the same quality product is not obtained. The dehydrating alcohol incorporated with the cellulose nitrate has a solvent action on the cellulose nitrate in the presence of a solvent plasticizer. Consequently, the colloid is soft and adhesive on the rolls during processing, the charge adheres tenaciously to the heated rolls, and fails to automatically break at the roll bite, requiring stripping at each pass through the rolls. Such stripping lowers the contact time of the charge on the rolls, thereby reducing the efficiency. The softness of the colloid further reduces efficiency because the shearing force of the rolls does not become effective until the colloid has lost sufficient alcohol by volatilization to give the required stiffness. Furthermore, the stripping operation requires the constant attendance of an operator for each two-roller mill, whereas the water-wet operation requires an attendant only at the initial charging and final stripping (which represents only a small fraction of the processing time), thereby permitting an operator to handle as many as three roller mills simultaneously.

Established safety regulations specify that cellulose nitrate be alcohol-wet to the extent of 35 parts of alcohol in 100 parts of wet fibrous cellulose nitrate, or 30 parts in 100 parts of wet, dense, non-fibrous cellulose nitrate. Regulations are more lenient when the medium is water. The preferred examples provide for water-wet cellulose nitrate with a water content less than 25%, preferably in the range of 20% to 25%. This also offers an economic advantage, because the initial charge may consist of a higher non-volatile content.

The compositions of the premixes shown in the examples demonstrate that, in the dispersion of carbon black pigment, the ratio of water to carbon black in the premix must be held to relatively narrow limits heretofore not disclosed in the prior art. It has been found that for each 100 parts of total carbon black pigment and water present in the premix, the water should be within the range of about 55 to 70 parts (preferably 55 to 65 parts), the total pigment and water constituting from 25% to 50% (preferably 25% to 40%) of the composition which is to be premixed. This water, contrary to earlier conceptions of carbon black dispersion, contributes to improved quality of dispersion by actions not fully understood. In the preliminary mixing, the water causes at least partial degassing of the pigment, and, in the dispersing stage, it contributes certain viscosity and heat transfer conditions important to the operation of the invention.

Prior art dispersion processes in which pigment, dry or wet with water, is dispersed in a cellulose nitrate medium initially wet with water, fail to disclose this novel process, which is specific to the dispersion of carbon black pigments, the components being intimately premixed without colloid formation and then subjected to high shearing forces and colloid formation on a two-roller mill. The properly balanced composition is colloided under heat and pressure in a substantially automatic operation, except for charging the premixed product and discharging the dispersion product.

The fine grain, uncolloided structure of the premix stage product is important to the operation since it permits presetting of the clearance of the rolls without readjustment during processing. Colloided particles or fully colloided premixes require wider rolls clearance in order that the material may be sheeted, and then the clearance must be reduced to increase the shearing force. Conventional premixing of carbon black pigment is generally carried out in a Werner and Pfleiderer mixer or the like where the components are at least partially colloided under a shearing force and then transferred to other dispersion equipment having higher shearing power for the final dispersion. The preliminary mixing stage of the present invention may be carried out in such a mixer, but that operation offers no quality improvement over the distinctly more economical tumbling preliminary mixing.

The dispersing stage on the rolls serves an added function, which is novel to conventional roller dispersing processes and which adds to operating efficiency. This added function is accomplished only by proper balance of the composition and size of the charge, and both of these factors are controlled by the physical characteristics of the machine. The charge must be of sufficient size to permit complete enveloping of one roll with sheeted stock plus an excess remaining at the bite of the rolls, this excess being preferably in the range of 10% to 30% of the charge. The excess material is in constant motion, adding a novel mixing force superimposed on the higher shearing forces of the differential rolls. This mixing force aids in providing automatic character to the operation. As the two forces counterbalance the adhesion of the sheet colloid to the roll, the weak cohesive forces of the sheeted material permit the sheet to disintegrate into small pieces which are readily and automatically incorporated in the mixing excess material at the bite of the rolls. Repeated stripping of the sheet stock for recharging at the rolls bite by conventional operations fails to accomplish this novel added economical function of the rolls. Unless the composition is in proper plasticity balance, the excess material will not form a constantly mixing charge at the rolls bite, and the excess will become an integral part of a continuous sheet of stock, the equivalent circumference of which is greater than that of either of the two rolls of the machine and thereby leaving no mixing excess at the rolls bite.

Although other pigments may be dispersed by this novel process, it is specifically applicable to the dispersion of channel type carbon black pigments which require high shearing forces for optimum quality of dispersion.

Dispersions of carbon black are relatively low pigmented products and low pigmentations permit wide potential variation in composition in establishing the preferred balance. Automotive black lacquers on the average contain 0.2 pound of carbon black pigment per gallon. Other colored lacquers generally contain pigment ranging from 0.5 to 1.0 pound per gallon necessitating the use of dispersion intermediates containing substantially more pigment than the carbon black intermediates heretofore described. A threefold or more increase in pigmentation narrows the potential variation in vehicle composition, thereby making it difficult to adjust the composition to the desired balance of plasticity and adhesive characteristics conforming to the operating requirements of this novel process.

The process of this invention constitutes a novel method of economically dispersing carbon black pigment which results in a consistently uniform quality dispersion. Lacquers prepared from dispersion intermediates processed by this method are superior in jetness of color, gloss, and freedom from dispersion grid in comparison with similar compositions prepared with dispersions formulated with alcohol-wet cellulose nitrate. Use of this process also constitutes significant economy in the following respects: The use of water-wet cellulose nitrate eliminates the cost of alcohol dehydration of the cellulose ester and eliminates the loss accompanying volatilization of the alcohol on the rolls. Labor costs are reduced by the automatic character of the operation which permits an operator to simultaneously operate as many as three machines, whereas conventional rolls operations require full attendance of one man per machine. Combustion hazards are reduced to a minimum with water rather than alcohol as the volatile constituent. The preliminary mixing is a simple, economical operation in which the components are tumbled together to form an intimate uniform mixture without the heavy power consumption necessary in colloid formation. The rolls operation offers efficiency greater than heretofore known by superimposing a mixing force on the shearing force of the differential rolls.

It is apparent that many widely different embodiments of this invention can be made without departing from the spirit and scope thereof; and, therefore, it is not intended to be limited except as indicated in the appended claims.

I claim:

1. The process of dispersing carbon black pigment, which comprises premixing water-wet cellulose nitrate, a plasticizer, and carbon black pigment to form a damp, black powder in which these components are uniformly distributed with substantially no colloid formation, the water in the mass to be premixed constituting 55–70% of the total pigment and water, and thereafter subjecting the premixed product to colloid formation on a differential speed two-roller mill in which the slower roll is maintained at a temperature of 140–175° F. and the faster roll is maintained at a temperature not greater than 100° F.

2. The process of claim 1 in which the water content of the water-wet cellulose is less than 25%.

3. The process of claim 1 in which the total pigment and water constitute about 25% to 50% of the mass to be premixed.

4. The process of dispersing carbon black pigment which comprises premixing water-wet cellulose nitrate, a plasticizer, and carbon black pigment, to form a damp, black powder in which these components are uniformly distributed with substantially no colloid formation, the water in the mass to be premixed constituting 55–70% of the total pigment and water, and thereafter subjecting the premixed product to colloid formation on a differential speed two-roller mill in which the slower roll is maintained at a temperature of 140–175° F. and the faster roll is maintained at a temperature not greater than 100° F. until substantially all the water is volatilized.

5. The process of dispersing carbon black pigment which comprises premixing water-wet cellulose nitrate, a plasticizer, and carbon black pigment, to form a damp, black powder in which these components are uniformly distributed with substantially no colloid formation, the water in the mass to be premixed constituting 55–70% of the total pigment and water, and thereafter subjecting the premixed product to colloid formation on a differential speed two-roller mill in which the slower roll is maintained at a temperature within the range of 140–175° F. and the faster roll is maintained at a temperature not greater than 100° F., and repeatedly passing the product through the bite of the rolls until substantially all the water is volatilized.

6. The process of dispersing carbon black pigment which comprises premixing water-wet cellulose nitrate, a plasticizer, and carbon black pigment, to form a damp, black powder in which these components are uniformly distributed with substantially no colloid formation, the water in the mass to be premixed constituting 55–70% of the total pigment and water, charging on a differential speed two-roller mill in which the slower roll is maintained at a temperature of 140–175° F. and the faster roll is maintained at a temperature not greater than 100° F., an amount of the premixed product about 10% to 30% in excess of that required to completely envelop one roll with sheeted stock, and repeatedly passing the product through the bite of the rolls until substantially all the water is volatilized.

7. The process of dispersing carbon black pigment, which comprises premixing water-wet cellulose nitrate, a plasticizer, carbon black pigment, and a dispersing agent to form a damp, black powder in which these components are uniformly distributed with substantially no colloid formation, the water in the mass to be premixed constituting 55–70% of the total pigment and water, and thereafter subjecting the premixed product to colloid formation on a differential speed two-roller mill in which the slower roll is maintained at a temperature of 140–175° F. and the faster roll is maintained at a temperature not greater than 100° F.

OTTO SIEMONS.

REFERENCES CITED

The following references are of record in the file of this patent:

UNITED STATES PATENTS

| Number | Name | Date |
|---|---|---|
| 1,987,980 | Sweitzer | Jan. 15, 1935 |
| 2,094,146 | Elliott et al. | Sept. 28, 1937 |
| 2,140,745 | Hucks | Dec. 20, 1938 |